(12) United States Patent
Bastiaan et al.

(10) Patent No.: US 9,383,280 B2
(45) Date of Patent: Jul. 5, 2016

(54) DIAPHRAGM ASSEMBLY FOR A PRESSURE SENSOR, AND A PRESSURE SENSOR PROVIDED WITH SUCH ASSEMBLY

(75) Inventors: Robert-Paul Bastiaan, Rotterdam (NL); Nicolaas Adrianus Johannes Bernardus Bontje, Kaatsheuvel (NL); Reijer Wolting, Dordrecht (NL)

(73) Assignee: Badotherm Proces Instrumentatie B.V. (NL)

(*) Notice: Subject to any disclaimer, the term of this patent is extended or adjusted under 35 U.S.C. 154(b) by 178 days.

(21) Appl. No.: 13/884,812

(22) PCT Filed: Nov. 10, 2011

(86) PCT No.: PCT/NL2011/050769
§ 371 (c)(1),
(2), (4) Date: Jun. 4, 2013

(87) PCT Pub. No.: WO2012/064190
PCT Pub. Date: May 18, 2012

(65) Prior Publication Data
US 2013/0263678 A1   Oct. 10, 2013

(30) Foreign Application Priority Data
Nov. 11, 2010 (NL) .................................. 2005673

(51) Int. Cl.
*G01L 7/08* (2006.01)
(52) U.S. Cl.
CPC ........... *G01L 7/082* (2013.01); *Y10T 428/1241* (2015.01); *Y10T 428/12444* (2015.01); *Y10T 428/12986* (2015.01)

(58) Field of Classification Search
None
See application file for complete search history.

(56) References Cited

U.S. PATENT DOCUMENTS

| 4,399,706 | A | † | 8/1983 | List |
| 4,520,056 | A | * | 5/1985 | Jackrel .......................... 428/68 |
| 4,976,856 | A | * | 12/1990 | Van Der Scheer et al. ... 210/490 |
| 5,679,399 | A | * | 10/1997 | Shlenker et al. .............. 427/2.3 |
| 5,741,975 | A | * | 4/1998 | Vaughn et al. ................. 73/706 |
| 6,263,739 | B1 | † | 7/2001 | Seefried |
| 6,845,674 | B2 | | 1/2005 | Becker et al. |
| 6,991,213 | B2 | † | 1/2006 | Wang |
| 2001/0018095 | A1 | * | 8/2001 | Shlenker et al. .............. 427/337 |
| 2002/0178824 | A1 | | 12/2002 | Becker et al. |

FOREIGN PATENT DOCUMENTS

| CN | 201141790 | | 10/2008 |
| DE | 3121799 | † | 12/1982 |
| DE | 20006226 | † | 8/2000 |
| DE | 201 07 260 | | 8/2001 |

(Continued)

OTHER PUBLICATIONS

International Searching Authority, International Search Report and Written Opinion mailed on Feb. 28, 2012, issued in connection with International Application No. PCT/NL2011/050769 filed on Nov. 10, 2011, 6 pages.

*Primary Examiner* — Andre Allen
(74) *Attorney, Agent, or Firm* — McDonnell Boehnen Hulbert & Berghoff LLP.

(57) ABSTRACT

The present disclosure is related to diaphragm assembly for a pressure sensor including a multi-layered assembly of an outer diaphragm and an inner diaphragm, and an intermediate layer between both diaphragms, the intermediate layer being made of a solid material which is permeable to air.

24 Claims, 1 Drawing Sheet

(56) References Cited

FOREIGN PATENT DOCUMENTS

| | | |
|---|---|---|
| DE | 20107260 | 8/2001 |
| GB | 1 356 783 | 6/1974 |
| JP | S57160034 | 10/1982 |
| JP | S57160035 | 10/1982 |
| WO | 94/09349 | 4/1994 |
| WO | 9409349 † | 4/1994 |

\* cited by examiner
† cited by third party

DIAPHRAGM ASSEMBLY FOR A PRESSURE SENSOR, AND A PRESSURE SENSOR PROVIDED WITH SUCH ASSEMBLY

CROSS-REFERENCE TO RELATED APPLICATIONS

This national stage patent application under 35 U.S.C. §371 claims priority to PCT application no. PCT/NL2011/050769 filed Nov. 10, 2011, which claims priority to Netherlands patent application no. 2005673 filed Nov. 11, 2010, the disclosures of each of which are incorporated herein by reference for all purposes.

BACKGROUND

The disclosure relates to a diaphragm assembly for a pressure sensor.

In the art, pressure sensors are known in which a fixed diaphragm is mounted. The pressure sensor is coupled at one side to external equipment in which an external process is performed. Another part of the pressure sensor is coupled to a measuring unit. In the pressure sensor, the diaphragm is mounted in a sealing way so that it constitutes a physical separation between the part connected to the external process, and the part connected to the measuring unit. Accordingly, one side of the diaphragm is exposed to an external pressure to be measured. The other side of the diaphragm is exposed to a measuring fluid. The measuring fluid is kept in a chamber adjacent to the inner side of the diaphragm.

The principle of the pressure sensor is based on the fact that an external pressure exerted on the diaphragm causes a deflection thereof, whereby the diaphragm transmits a pressure onto the measuring fluid. The measuring fluid is via a channel connected to a measuring device that records the change in pressure within the measuring fluid. The measuring fluid is usually a viscous, inert oil such as a silicone oil or a halocarbon type of oil, and is also referred to in the art as a 'pressure transmitter medium'. The diaphragms are usually made of flat steel sheets having a corrugated surface. In the art, the diaphragms are also referred to as membranes, because of their flexible action.

Over recent years, pressure sensors of the above type have been developed that are able to perform highly accurate measurements with a deviation of only 0.025%. The use of this type of sensors is however limited to pressure measurements of external processes wherein the temperature does not exceed approx. 400° C. This is due to the fact that heat is transmitted by the diaphragm between the external process and the measuring fluid. The measuring fluids that are commonly used are not resistant to such high temperatures, as they decompose above approx. 400° C. Obviously, the decomposition of the measuring fluid compromises an accurate pressure measurement severely.

SUMMARY

The disclosure is aimed at providing a pressure sensor, and more specifically a diaphragm assembly for a pressure sensor, which allows a measuring of an external process in which a temperature of 400° C. is exceeded, while assuring the measuring fluid is not decomposed by the external heat. The development of a pressure sensor for such higher temperature ranges is in general of interest in the (petro-) chemical processing industry, as well as in view of plants for harvesting solar energy, wherein heat transporting fluids are used under pressure. At the same time, such a pressure sensor should be able to achieve highly accurate measurements, comparable to the known pressure sensors that are used at lower temperatures. Furthermore, it would be beneficial if such a pressure sensor is reliable and durable, and the diaphragm assembly has a simple design. The simple design allows for easy maintenance or replacement of spare parts.

The above general and specific objectives are met wholly or in part, by the disclosure.

BRIEF DESCRIPTION OF THE DRAWINGS

Embodiments of the present disclosure are illustrated in the following drawings which depict an example embodiment according to the disclosure. These drawings are not intended to limit the scope of the disclosure.

DETAILED DESCRIPTION

Figure 1:
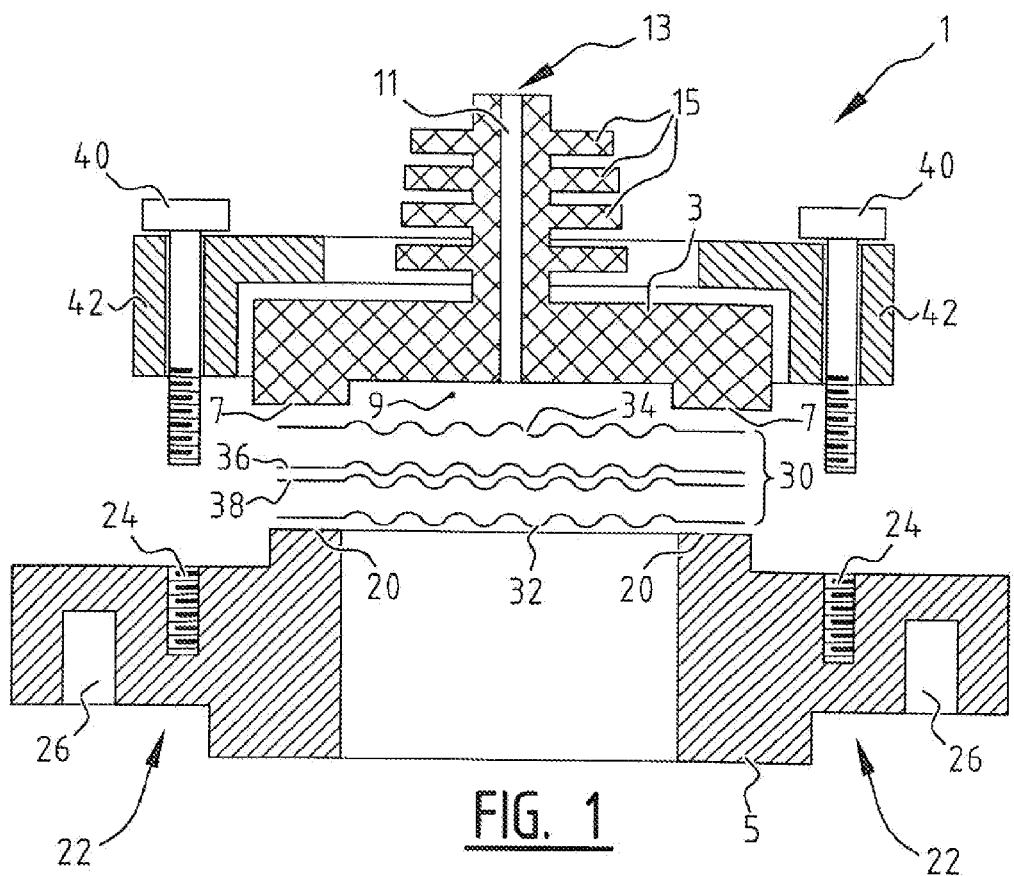
FIG. 1 shows a cross-sectional view of an embodiment of the pressure sensor according to the disclosure.

In a first aspect, the disclosure therefore relates to a diaphragm assembly for a pressure sensor, comprising a multi-layered assembly of an outer diaphragm and an inner diaphragm, and an intermediate layer between both diaphragms, the intermediate layer being made of a solid material which is permeable to air. Due to the intermediate layer, the diaphragm assembly achieves a reduced exchange of heat between the outer and inner diaphragm, so that the pressure sensor can be used for external processes in the range up to 600-700° C., while the temperature of the measuring fluid is kept below 400° C. It is surprising that such an intermediate layer has a capacity to achieve such an insulating effect by its provision between the two diaphragms. In addition, the design of the diaphragm assembly as a multi-layer allows an easy replacement of the intermediate layer, if necessary.

On the one hand, the intermediate layer transmits over its whole surface area, the deflection action of the outer diaphragm onto the inner diaphragm, so that an accurate measurement is assured. On the other hand, and due to its permeability to air, the intermediate layer at the same time is capable of heat exchange with surrounding air. This heat exchange effectively achieves a reduction of the heat exchanged between inner and outer diaphragm. The permeability of the material for the intermediate layer is for instance based on a solid material having pores, or through-openings.

A useful material for the diaphragms of the disclosure is stainless steel, preferably of AISI 316 quality. Other examples of useful materials include Tantalum, Titanium, Nickel, and commercially available metals such as Monel, Hastelloy, Inconel, etc. In principle the material should be impermeable, flexible, and resistant to the conditions of the external process, such as high temperatures and pressures, corrosive environments, etc. The diaphragms are preferably formed as flat, circular sheets having a corrugated surface. Obviously, the inner diaphragm does not necessarily have to fulfil the same requirement in regard of resistance to corrosive environments as the outer diaphragm, because the inner diaphragm is not directly exposed to the external process and the compounds therein.

Advantageously, the membranes are further coated with a coating based on gold, silver, PFA, PTFE, or DLC (Diamond-like Carbon).

Preferably, the diaphragm assembly of the disclosure allows the intermediate layer to be in fluid communication with ambient air. In the multi-layered assembly, the intermediate layer is intrinsically in fluid communication with the environment when the surroundings of the intermediate layer are open, between the inner and outer diaphragm. In this way, the assembly allows ambient air to flow through the intermediate layer, so that automatically a heat exchange is achieved. The assembly thus requires no further adaptations in order to achieve the cooling effect of the intermediate layer.

In another preferred embodiment of the disclosure, the intermediate layer is in the form of a gauze or sieve of solid material. This form has proven to achieve a satisfactory heat exchange with surrounding air.

A useful material for the intermediate layer of the disclosure is stainless steel, preferably of AISI 316 quality. This material shows a satisfactory heat exchange with surrounding air, and is durable. It is noted that the material for the intermediate layer does not necessarily have to fulfil the same requirements as for the outer diaphragm, as the intermediate layer is not directly exposed to the external process and the compounds therein. The intermediate layer preferably has one or more of the following additional properties: flexibility, resistance to heat, and non-deformation by compression.

Preferably, the intermediate layer has a corrugated surface which is congruent with the corrugated surface of the neighbouring inner and outer diaphragm. As such, the assembly is easily stacked as a multi-layer, wherein the contact surface between all layers is optimized, while providing an open surrounding for the intermediate layer allowing a fluid communication with ambient air.

Preferably, the intermediate layer is held between the inner and outer diaphragm, by a clamping force, as will be discussed in detail below.

According to the disclosure, the diaphragms preferably have a thickness between 0.010-0.30 mm, in particular between 0.050-0.100 mm, most particularly around 0.075 mm. The intermediate layer has a similar thickness as the diaphragms above, most particularly around 0.070 mm.

Advantageously, the diaphragm assembly according to disclosure comprises an intermediate layer which is built up as a stack of a plurality of distinct intermediate layers. The number of intermediate layers may vary between 2 and 20, in particular between 5 and 15, most particular around 10. Each intermediate layer within the stack has a thickness as indicated above, thus leading to a total thickness of the stack of intermediate layers, which is the product of the number of layers multiplied by their thicknesses.

For instance, a stack of 10 intermediate layers of 0.070 mm, leads to an intermediate layer having a total thickness of 0.700 mm.

The stack of intermediate layers may be easily varied, to comply with different required properties when the pressure sensor is used for different applications.

In a second aspect of the disclosure, the disclosure relates to a pressure sensor assembly that includes
  a diaphragm seal body, having a diaphragm side which comprises a chamber for containing a pressure measuring fluid, and a channel designed for connecting the chamber to a measuring device,
  a mounting body which is at an inner side designed for assembling to the diaphragm side of the diaphragm seal body, and at an outer side is designed for mounting the pressure sensor to external equipment of which an external pressure is to be measured,
  a diaphragm assembly according to the disclosure, fixed between the diaphragm side of the diaphragm seal body, and the inner side of the mounting body, and
  wherein the diaphragm seal body and the mounting body are assembled to each other by coupling means.

Such a pressure sensor is suitable for achieving a reduced transmission of heat from the outer diaphragm to the inner diaphragm, thereby achieving the advantages mentioned above. The fixation of the diaphragm assembly between the two assembled bodies, allows furthermore for an easy change of the intermediate layer, when necessary. The coupling means may be any known means in the art, such as bolts, nuts, bores, etc. that couple the two bodies to each other. In addition, the coupling means may comprise rings or flanges that assist in making the connections between the two bodies.

For clarity's sake it is noted that the fixation of the diaphragm assembly is such that herein the inner diaphragm faces the internal chamber of the diaphragm seal body, and the outer diaphragm faces the inner side of the mounting body. However, if the inner and outer diaphragms are essentially of the same quality, the fixation between the pressure sensor's bodies may obviously be established in a reversed manner as well.

Advantageously, the channel of the diaphragm seal body is at one side provided with coupling means for coupling to a measuring device. The pressure sensor is thus easily connectable to a measuring device.

Preferably, the pressure sensor of the disclosure allows the intermediate layer of the diaphragm assembly, to be in fluid communication with ambient air. In this way, the sensor allows ambient air to flow through the intermediate layer, so that automatically a heat exchange is achieved. The pressure sensor thus requires no further adaptations in order to achieve the cooling effect of the intermediate layer.

Preferably the diaphragm seal body is provided with an increased effective surface for cooling to ambient air. This feature further reduces the temperature of the measuring fluid, thus further broadening the applicability of the pressure sensor to external processes with temperatures above 400° C.

Advantageously, in the pressure sensor of the disclosure, the inner diaphragm is durably and sealingly connected to the diaphragm seal body, and the outer diaphragm is durably and sealingly connected to the mounting body. Any known method well suited for making such connections may be used, wherein welding is a preferred method. The pressure sensor as such secures a sealing fixation of the diaphragm assembly between the external process measured and the measuring fluid.

In FIG. 1, a pressure sensor 1 according to the disclosure is shown in a partly exploded view: wherein the diaphragm seal body 3, and the mounting body 5 are shown in a yet unassembled fashion. The diaphragm seal body 3, comprises a diaphragm side 7, which comprises a chamber 9 for containing a pressure measuring fluid, and a channel 11 which connects the chamber to an exit 13. The exit 13 is designed in such a way that it can be coupled to a measuring device, via a capillary channel (not depicted). The diaphragm seal body 3 further comprises a multitude of ribs 15, providing an increased effective surface for heat exchange to ambient air. The mounting body 5 has an inner side 20 designed for assembling to the diaphragm side 7 of the diaphragm seal body 3, and at an outer side 22 designed for mounting the sensor to external equipment of which an external pressure is to be measured. Next to the inner side 20, assembling bores 24 with threading are provided. On the outer side 22, mounting bores 26 are provided, for coupling to external equipment.

Between the two bodies 3 and 5, a diaphragm assembly 30 is shown, wherein the components thereof are depicted in a spaced apart fashion, for clarity's sake. The diaphragm assembly 30 consists of a multi-layered assembly of an outer diaphragm 32 and an inner diaphragm 34, and a stack of two intermediate layers 36 and 38, between both diaphragms, the intermediate layers being in the form of a gauze of solid material. The components 32, 34, 36, 38 of the assembly 30 have a corrugated surface area for their main part, wherein the outer edges of the components are flat, and non-corrugated. At their flat outer edges, the inner diaphragm 34 and the outer diaphragm 32 are respectively welded onto the diaphragm side 7 of the diaphragm seal body 3 and the inner side 20 of the mounting body 5. The intermediate layers 36 and 38 are loosely provided between the diaphragms 32 and 34. By assembling the bodies 3 and 5 together, all of the components 32, 34, 36, 38, are clamped together as a multilayer assembly. The assembling of the bodies 3 and 5 is established by the bolts 40 which are led through a ring 42 surrounding and gripping the diaphragm seal body 3, and screwed into bores 24, so that bodies 3 and 5 are assembled to each other. The bores 26 can in an analogous manner be used for mounting the assembled pressure sensor 1 onto external equipment (not shown).

Figure 2:
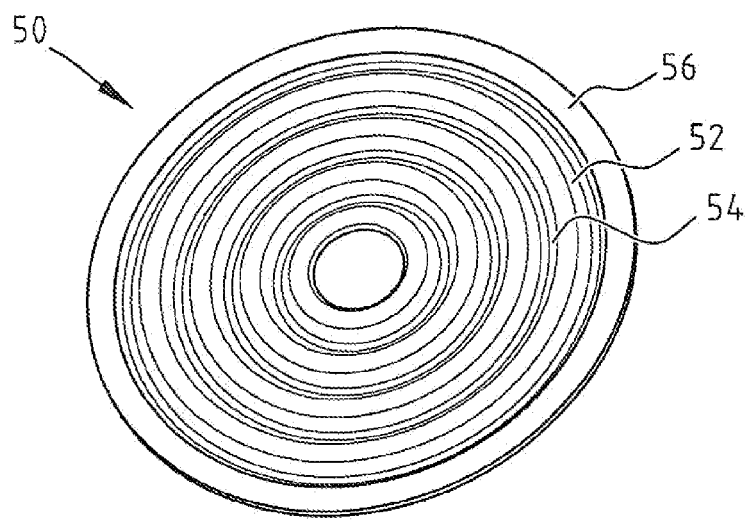
FIG. 2 shows a diaphragm for use in the diaphragm assembly according to the disclosure.

In FIG. 2, a diaphragm 50 is shown which is useful as either an inner or outer diaphragm as shown in FIG. 1. The diaphragm 50 is made of an impermeable, circular sheet or disc of stainless steel which has a corrugated surface area, according to a circular pattern of alternating projections 52 and depressions 54, which appear as waves in cross-section such as depicted in FIG. 1. The outer edge area 56 of the diaphragm 50 is flattened.

A suitable intermediate layer for the diaphragm assembly according to the disclosure is congruent with the depicted diaphragm 50 with respect to the dimensions, the flat outer edge area, and the corrugated surface as depicted in FIG. 2. The material of which the intermediate layer is made however, is a gauze material of stainless steel, instead of an impermeable circular sheet.

In some aspects of the present disclosure, a diaphragm assembly is provided including a multi-layered assembly including an outer diaphragm, an inner diaphragm, and an intermediate layer between the outer diaphragm and the inner diaphragm, wherein the intermediate layer includes a solid material which is permeable to air.

Certain aspects include that the intermediate layer is in fluid communication with ambient air.

Certain aspects include that the intermediate layer includes at least one of a gauze and a sieve of solid material.

Certain aspects include that the solid material of the intermediate layer includes stainless steel.

Certain aspects include that one or more of the outer diaphragm, the inner diaphragm, and the intermediate layer include a corrugated surface.

Certain aspects include that the intermediate layer includes a plurality of distinct layers formed in a stacked configuration.

Certain aspects include that one or more of the outer diaphragm, the inner diaphragm, and the intermediate layer include a non-corrugated outer edge.

In some aspects of the present disclosure, a pressure sensor assembly is provided including a diaphragm seal body, having a diaphragm side which comprises a chamber configured to contain a pressure measuring fluid, and a channel configured to connect the chamber to a measuring device, a mounting body including a first side configured to assemble with the diaphragm side of the diaphragm seal body, and a second side configured to operatively couple to an external device, and a diaphragm assembly configured to operatively couple between the diaphragm side of the diaphragm seal body and the first side of the mounting body, wherein the diaphragm seal body and the mounting body are assembled by coupling means.

Certain aspects include that the diaphragm assembly includes a multi-layered assembly including an outer diaphragm, an inner diaphragm, and an intermediate layer between the outer diaphragm and the inner diaphragm, wherein the intermediate layer includes a solid material which is permeable to air, and wherein the intermediate layer of the diaphragm assembly is configured to be in fluid communication with ambient air.

Certain aspects include that the diaphragm seal body is provided with an effective surface for heat exchange to ambient air.

Certain aspects include that the inner diaphragm is configured to durably and sealingly connect to the diaphragm seal body, and the outer diaphragm is configured to durably and sealingly connect to the mounting body.

Certain aspects include that the intermediate layer includes at least one of a gauze and a sieve of solid material.

Certain aspects include that the solid material of the intermediate layer includes stainless steel.

Certain aspects include that one or more of the outer diaphragm, the inner diaphragm, and the intermediate layer include a corrugated surface.

Certain aspects include that the intermediate layer includes a plurality of distinct layers formed in a stacked configuration.

Certain aspects include that the effective surface of diaphragm seal body includes a plurality of ribs.

Certain aspects include that the diaphragm seal body includes a ring through which at least one screwing member is positioned.

Certain aspects include that the first surface of the mounting body includes at least one threading bore configured to receive the at least one screwing member of the diaphragm seal body when the mounting body is assembled with the diaphragm seal body.

Certain aspects include that the second surface of the mounting body includes at least one mounting bore configured to operatively couple with the external device.

Certain aspects include that one or more of the outer diaphragm, the inner diaphragm, and the intermediate layer include a non-corrugated outer edge.

Various other modifications and alterations in the structure and method of operation of this disclosure will be apparent to those skilled in the art without departing from the scope and spirit of the embodiments of the present disclosure. Although the present disclosure has been described in connection with particular embodiments, it should be understood that the present disclosure as claimed should not be unduly limited to such particular embodiments. It is intended that the following claims define the scope of the present disclosure and that structures and methods within the scope of these claims and their equivalents be covered thereby.

The invention claimed is:

1. A diaphragm assembly, comprising:
a multi-layered assembly including a sheet-like impermeable outer diaphragm, a sheet-like impermeable inner diaphragm, and an intermediate layer arranged between the outer diaphragm and the inner diaphragm, wherein the intermediate layer comprises an interconnected solid material which is permeable to air.

2. The diaphragm assembly of claim 1, wherein the intermediate layer is in fluid communication with ambient air.

3. The diaphragm assembly of claim 1, wherein the intermediate layer includes at least one of a gauze and a sieve of solid material.

4. The diaphragm assembly of claim 1, wherein the solid material of the intermediate layer includes stainless steel.

5. The diaphragm assembly of claim 1, wherein one or more of the outer diaphragm, the inner diaphragm, and the intermediate layer include a corrugated surface.

6. The diaphragm assembly of claim 1, wherein the intermediate layer includes a plurality of distinct layers formed in a stacked configuration.

7. A pressure sensor assembly, comprising:
a diaphragm seal body, having a diaphragm side which comprises a chamber configured to contain a pressure measuring fluid, and a channel configured to connect the chamber to a measuring device;
a mounting body including a first side configured to assemble with the diaphragm side of the diaphragm seal body, and a second side configured to operatively couple to an external device; and
a diaphragm assembly configured to operatively couple between the diaphragm side of the diaphragm seal body and the first side of the mounting body;
wherein the diaphragm seal body and the mounting body are assembled by coupling means; and
wherein the diaphragm assembly includes a multi-layered assembly including an impermeable outer diaphragm, an impermeable inner diaphragm, and an intermediate layer arranged between the outer diaphragm and the inner diaphragm, wherein the intermediate layer comprises an interconnected solid material which is permeable to air, and wherein the intermediate layer of the diaphragm assembly is configured to be in fluid communication with ambient air.

8. The pressure sensor assembly of claim 7, wherein the diaphragm seal body is provided with an effective surface for heat exchange to ambient air.

9. The pressure sensor assembly of claim 7, wherein the inner diaphragm is configured to durably and sealingly connect to the diaphragm seal body, and the outer diaphragm is configured to durably and sealingly connect to the mounting body.

10. The pressure sensor assembly of claim 7, wherein the intermediate layer includes at least one of a gauze and a sieve of solid material.

11. The pressure sensor assembly of claim 7, wherein the solid material of the intermediate layer includes stainless steel.

12. The pressure sensor assembly of claim 7, wherein one or more of the outer diaphragm, the inner diaphragm, and the intermediate layer include a corrugated surface.

13. The pressure sensor assembly of claim 7, wherein the intermediate layer includes a plurality of distinct layers formed in a stacked configuration.

14. The pressure sensor assembly of claim 8, wherein the effective surface of diaphragm seal body includes a plurality of ribs.

15. The pressure sensor assembly of claim 7, wherein the diaphragm seal body includes a ring through which at least one screwing member is positioned.

16. The pressure assembly of claim 15, wherein the first surface of the mounting body includes at least one threading bore configured to receive the at least one screwing member of the diaphragm seal body when the mounting body is assembled with the diaphragm seal body.

17. The pressure assembly of claim 16, wherein the second surface of the mounting body includes at least one mounting bore configured to operatively couple with the external device.

18. The diaphragm assembly of claim 5, wherein one or more of the outer diaphragm, the inner diaphragm, and the intermediate layer include a non-corrugated outer edge.

19. The pressure sensor assembly of claim 12, wherein one or more of the outer diaphragm, the inner diaphragm, and the intermediate layer include a non-corrugated outer edge.

20. The diaphragm assembly of claim 1, wherein the intermediate layer comprises an interwoven layer of solid material.

21. The diaphragm assembly of claim 1, wherein the intermediate layer has one or more of the properties of being flexible and being non-deformable.

22. The diaphragm assembly of claim 1, wherein the intermediate layer comprises a sheet-like layer.

23. The diaphragm assembly of claim 1, wherein the intermediate layer has a thickness that is between 0.7 and 1.4 of a thickness of one of the outer diaphragm and the inner diaphragm.

24. The diaphragm assembly of claim 6, wherein the intermediate layer comprises between 5 and 15 distinct layers.

* * * * *